Aug. 6, 1940.  P. ONORATO ET AL  2,210,377
POULTRY TREATING APPARATUS AND METHOD
Filed Aug. 29, 1938  6 Sheets-Sheet 1

INVENTORS
Paul Onorato & Emile Weinaug
BY
Bair & Freeman
ATTORNEYS

Aug. 6, 1940.　　　P. ONORATO ET AL　　　2,210,377
POULTRY TREATING APPARATUS AND METHOD
Filed Aug. 29, 1938　　　6 Sheets-Sheet 3

INVENTORS
Paul Onorato & Emile Weinaug
BY Bair & Freeman
ATTORNEYS Aug. 6, 1940. P. ONORATO ET AL 2,210,377
POULTRY TREATING APPARATUS AND METHOD
Filed Aug. 29, 1938 6 Sheets-Sheet 4

INVENTORS
Paul Onorato & Emile Weinaug
BY
ATTORNEYS

Aug. 6, 1940.　　　　P. ONORATO ET AL　　　　2,210,377
POULTRY TREATING APPARATUS AND METHOD
Filed Aug. 29, 1938　　　　6 Sheets-Sheet 5

INVENTORS
Paul Onorato & Emile Weinaug
BY Bair & Freeman
ATTORNEYS

Patented Aug. 6, 1940

2,210,377

UNITED STATES PATENT OFFICE 2,210,377

POULTRY TREATING APPARATUS AND METHOD

Paul Onorato, San Mateo, and Emile Weinaug, San Francisco, Calif.; said Weinaug assignor to Barker Poultry Equipment Company, Ottumwa, Iowa Application August 29, 1938, Serial No. 227,356

22 Claims. (Cl. 17—11)

Our invention relates to an apparatus and method for treating poultry electrically.

This application is a continuation in part of our applications Serial No. 38,918, filed September 3, 1935, which is now Patent No. 2,152,083, dated March 28, 1939, and Serial No. 746,680, filed October 3, 1934, which is now Patent No. 2,152,082, dated March 28, 1939.

Specifically the present invention relates to an apparatus and method for subjecting poultry to an electrical current and cutting their throats. Our prior applications disclose apparatus for steaming poultry, which feature is not included in the present application.

In the preparation of poultry for the market, it is necessary to kill and bleed the birds and to remove the feathers. It has been customary to manually cut the throats of the birds and pierce their brains, allow the birds to bleed, sometimes to dip them in warm water and to pick and remove the feathers.

Because workmen often work on a piece-work basis, they hurry the operations as much as possible, with the result that sometimes the birds are not thoroughly bled. Furthermore during the employment of such former methods, the birds frequently struggle and flap during the bleeding operations, causing the blood to spatter on the feathers, thus rendering the feathers substantially worthless or less valuable as a by-product, causing contamination of blood which could be saved and used as another by-product and breaking the wings in a substantial number of instances. Frequently in the methods heretofore employed, the birds are dipped into warm water before muscle contraction ceases, and the lungs sometimes become filled with water.

It is our purpose to provide a method whereby the birds are electrically shocked and stunned or killed by subjecting them to an electric current, either at or near the head or at the extremities as hereinafter set forth, and to cut the throats of the birds immediately after they have been subjected to the electric current.

Another object is to provide a machine for supporting the birds, conveying them from point to point, subjecting them to the electric current, cutting their throats and holding them during the bleeding period.

Another object is to provide particular kinds of mechanism for accomplishing the purposes mentioned.

With these and other objects in view, our invention consists in the construction, arrangement and combination of the various parts of our device, and in the steps of the method herein set forth, whereby the objects contemplated are attained, as hereinafter more fully set forth, pointed out in our claims, and illustrated in the accompanying drawings, in which:

APPARATUS I

Referring to the form of machine shown in Figures 1 to 7, reference character A designates a plurality of vertical standards forming part of the main frame of the machine. Secured to the upper ends of the standards A is a rail or track 2 upon which travels a conveyor chain 3, preferably endless.

The main frame A consists of two sections B and C (Figure 1), which may be disposed at substantially right angles to each other. The conveyor chain 3 travels on sprockets 4, 5, 6 and 7. Sprocket 7 may be the driven one. The rail 2 prevents sagging of the conveyor chain 3.

Bird carriers

Figures 1, 3, 4:
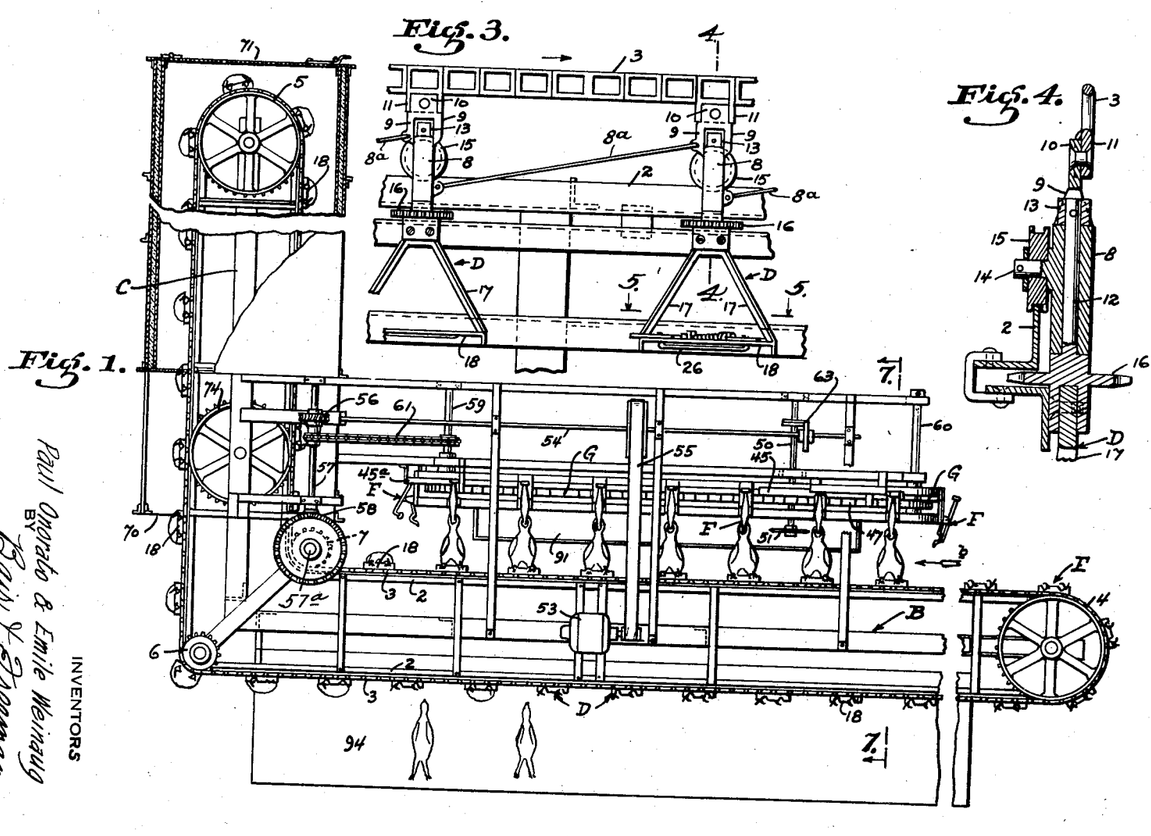
Figure 1 is a plan view of a machine of the kind mentioned, parts being broken away.
Figure 3 is an enlarged detailed elevation showing a portion of the conveyor, the gears and the rails supporting them.
Figure 4 is an enlarged vertical section taken on the line 4—4 of Figure 3.

Carriers D are secured to the chain at spaced intervals. The details of the structure of carriers D are illustrated in Figures 3 and 4. Each carrier has an elongated sleeve 8 which is forked at its upper end as indicated at 9, and terminates in an upper plate 10 riveted or otherwise secured to an extension lug 11 on the chain 3. A brace rod 8a is pivoted at its ends to part 8 of each carrier D and part 9 of the next carrier D.

A shaft 12 is received in the sleeve 8 and projects thereabove between the arms of the fork 9. On the upper end of the shaft 12 is detachably fixed a collar 13 to hold it against dropping out of the sleeve 8. Projecting from one side of the sleeve 8 is a spindle 14 on which is journalled a grooved roller 15 which travels on the rail 2. On the lower end of the shaft 12 is a gear 16 and projecting from the lower face thereof is a pair of arms 17 which support a flat plate like member 18.

Foot clamp of bird carrier D

The member 18 (Figure 5) has at one edge a pair of spaced notches 19 to receive the legs of a chicken. Pivoted on the upper face of the member by means of pins 22 are clamping members 20 and 21. Each clamping member comprises what might be called a plate having an arm 23. From the arms 23 pins 24 project through arcuate slots 25 in the plate 18. The ends of the slots 25 serve as stops. The pins are linked below the plate by a rod 26, Figure 3, so that both clamping members are linked to move in unison. Each clamping member 20 and 21 is provided with what may be called a clamping arm 28 and an ejecting arm 29. The member 20 is provided with a hand lever 27. The member 21 is associated with an over-center locking rod 30. One end of this locking rod 30 is slidably extended through a lug 31 pivoted on the plate 18. The other end or head 32 of the rod 30 is seated in a socket 33 formed on the clamping plate 21. On the rod 30 adjacent the head 32 is fixed a collar 34. A coil spring 36 is interposed between the collar 34 and the pivoted lug 31.

Figures 5, 6:
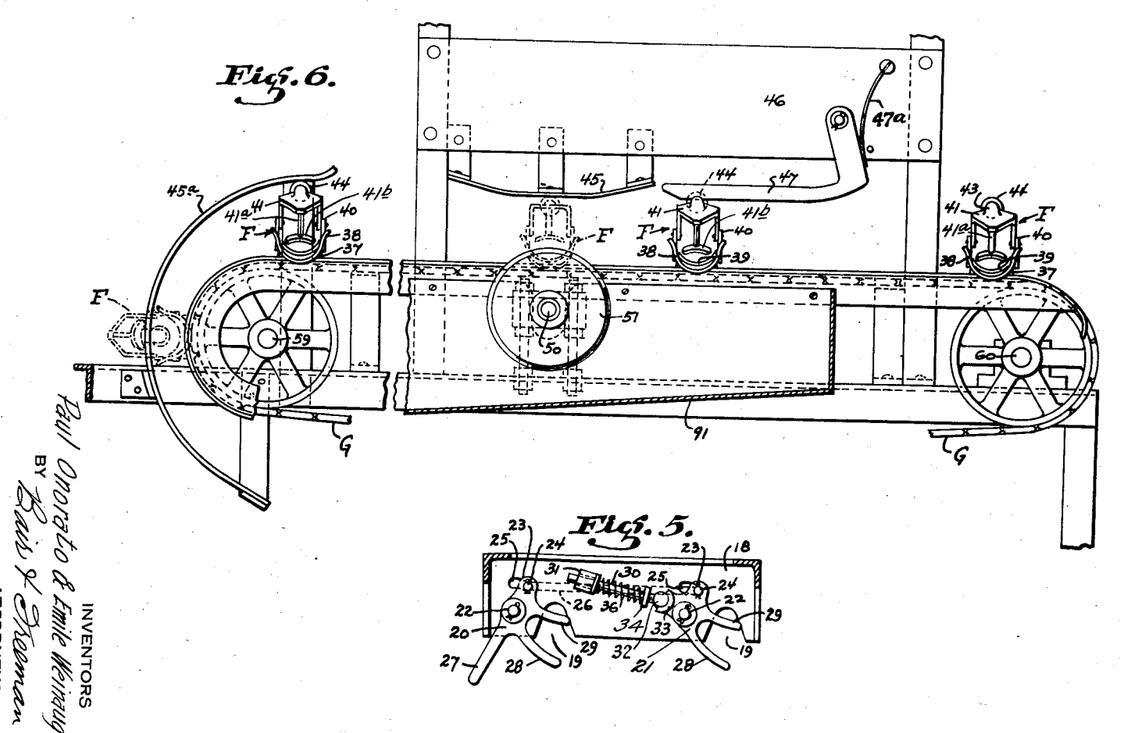
Figure 5 is an enlarged sectional view taken on the line 5—5 of Figure 3.
Figure 6 is an enlarged side elevation, parts being shown in section, illustrating the mechanism for holding the birds for subjecting them to the electric current and cutting their throats and holding them for bleeding.

It will be observed that the clamping members 20 and 21 are shown in Figure 5 in their inoperative positions. The legs of a bird may be inserted between the arms 28 and 29 of the respective clamping members and the lever 27 operated to move the clamping members to their locking position with the legs of the bird received in the slots 19. The rod 30 and its associated parts tend to swing over center during this movement. The rod 30 and its associated parts tend to hold the locking members in either of their extreme positions, to wit: either in inoperative position as shown in Figure 5, or in clamping position for holding the legs of the birds in the slots 19 where the birds are suspended on the endless chain conveyor.

Head clamp

Figures 7, 7A:
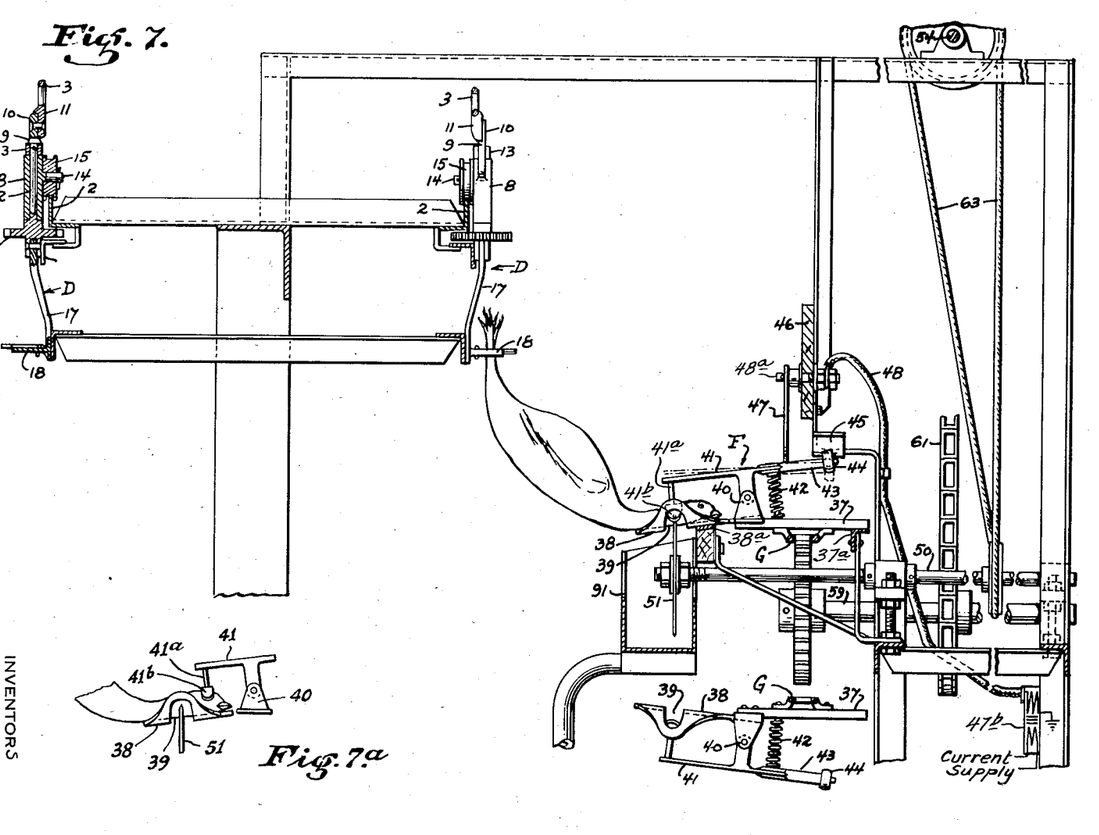
Figure 7 is an enlarged vertical cross section taken on the line 7—7 of Figure 1.
Figure 7a is a detailed elevation showing the electrode applied to the head of the bird.

The next operation is to secure the head of the bird by means of a clamping apparatus, which is illustrated in Figures 1, 6 and 7. The head clamp is indicated generally at F. It is carried by a secondary conveyor chain indicated at G. The head clamps are arranged at spaced intervals, the spacing being the same as the spacing of the carriers D having the foot clamps from which the birds are hung.

Each head clamp F has a plate 37 secured to the conveyor chain G (Figure 7). The plate 37 is of insulating material or is insulated from the chain. This plate 37 terminates in a plate 38 which has a part semi-circular or channel-shaped in cross section, Figure 6, and provided with a transverse notch or slot 39 (Figures 6 and 7), to receive the knife hereinafter described.

The plates 37 and 38 slide on frame members 37a and 38a. The frame member 38a is insulated from the main frame of the machine. The plate 38 has bearing lugs 40 formed thereon (Figure 7) and pivoted to the bearing lugs is a clamping plate 41 which projects in both directions from its pivot and is normally held in clamping position by a spring 42. The clamping plate 41 has at one end a downwardly projecting extension 41a which carries a yoke-like member 41b (Figure 6) arranged to coact with the clamping plate 38 and to register with the notch 39 in the plate 38.

At the other end, the plate 41 has an extension lever 43 having a roller 44 on its outer end, which is engageable with cam tracks 45 and 45a (Figures 2, 6 and 7) which tracks will be hereinafter referred to again.

Electrical device

Secured to the main frame, for example above the path of travel of the conveyor G and the clamping members F carried thereby, is an insulating member 46 on which is pivotally mounted a contact arm 47 of L-shape as shown in Figure 6. A spring 47a tends to yieldingly urge the contact arm 47 to contact-making position.

Suitably supported is a transformer 47b connected with a suitable source of current supply (Figure 7). One lead is grounded on the main frame A and the other indicated at 48 extends to a post 48a mounted in the insulation 46 and pivotally supporting the contact arm 47.

Knife

We provide means for cutting the throats of the birds as they travel along the conveyors. Suitably journaled in the frame below the upper line of travel of the head clamping members F on the endless chain G is a shaft 50 (Figures 1, 2, 6 and 7), on one end of which is secured a disc type cutting knife 51 disposed in alignment with the notches 39 in the plates 38 so that when the neck of a bird is clamped in a plate 38, the parts will cooperate for accomplishing the desired result. The knife is driven at a suitable speed and the knife and the main conveyor having chains 3 and the secondary conveyor having chains G are driven in unison.

Driving apparatus

Figure 2:
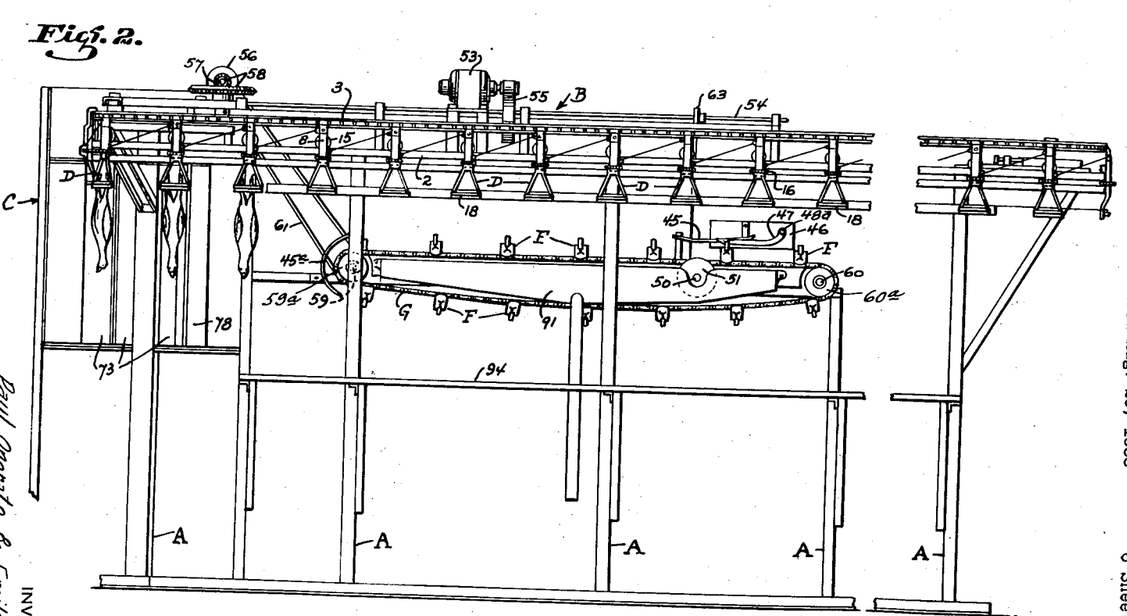
Figure 2 is a side elevation of the machine shown in Figure 1.

An electric motor 53 is supported on the main frame (Figures 1 and 2). The motor 53 drives a shaft 54 through belt and pulley gearing means 55. The shaft 54 extends lengthwise of the frame B. The shaft 54 through a reduction gear drive indicated at 56 (Figure 1) drives a shaft 57 extending longitudinally of the frame C.

The shaft 57 drives a vertical shaft 57a (Figure 1) through a pair of beveled gears indicated at 58. On the shaft 57a is the driving sprocket 7 of the main conveyor 3. The chain G of the secondary conveyor is carried by sprockets 59a and 60a mounted on shafts 59 and 60 (Figure 2). The shaft 60 is driven from the shaft 57 by suitable chain and sprocket gearing 61 (Figures 1 and 2).

The shaft 50 which carries the circular knife 51 is driven from the shaft 54 by suitable gearing 63 (Figures 1 and 7). The driving mechanism is so arranged that the main and secondary conveyors are driven in unison and at the same speed and so that the circular knife is continuously rotated at high speed during the operation of the machine.

Steaming chamber

Our invention here disclosed may be used in connection with a steaming chamber which is more fully described in our application, Serial No. 38,918, of which the present application is a continuation in part.

The steaming chamber has the enclosing parts 70 and 71 shown in Figure 1 but will not be further described.

Operation

We will describe the progress of a single bird and it will be understood one bird follows another in regular order through the machine. At what may be called the loading end of the machine at the right-hand of Figure 2 for example, an operator puts the legs of the bird between the arms 28 and 29 of the clamping members 20 and 21 and swings the clamping members from their position shown in Figure 5 to position where the arms 28 clamp the legs of the bird in the notches 19. The bird is then supported head downward from the main conveyor.

It will be obvious from Figure 1 that the frame B is longer than the conveyor G. After the bird has been hung on the main conveyor and when it reaches the conveyor G, the operator places the neck of the bird in the cradle-like end portion of the plate 38 while holding the left-hand end of the clamping plate 41 (Figure 7) raised and then allows the clamping plate 41 to move to clamping position where the yoke-like member 41b will overlie the neck of the bird above the slot 39 for snugly clamping the neck and head in place.

As the conveyor G advances the bird, the contact arm 47 is engaged by the extension 43 of the plate 41 (see Figs. 6 and 7) for closing a circuit and subjecting the bird to a charge of electricity.

It will be observed that the circuit is closed from the transformer 47b through the conductor 48, the post 48a, the contact arm 47, the extension 43, the plate 41, the downwardly extending member 41a and the yoke 41b to the head or neck of the bird. It may be preferable to have the yoke-like members 41b engage the comb or the head of the bird as in Figure 7a, because the feathers to some extent might affect the conduction of the current.

From the other side of the transformer 47b, the circuit extends through the frame of the machine to the foot clamp D and thus to the extremities of the bird.

Thus in this particular form in which our apparatus may be embodied, the foot clamps D hold the feet of the bird, the head clamp F holds the head and the bird is subjected to an electric current with poles contacting the feet or legs and the head or neck of the bird.

The bird is stunned or killed as may be desired and as will depend on the amount of current used.

Thus the birds may be subjected to whatever degree of electric shock may be considered most desirable for affecting the nervous system and stunning or killing the bird, causing muscular relaxation and preventing struggling and convulsions during the bleeding period.

The birds can, of course, be killed by the electric shock if that is found desirable or they may be subjected to merely a temporary paralysis which will affect the motor centers to accomplish the purpose and produce muscular relaxation. We find the stunning method preferable in some cases.

The amount of electricity to be used and the consequent degree of shock for affecting proper muscular relaxation to prevent struggling and breaking wings and to loosen the feathers may readily be determined and will vary somewhat according to the age of the birds.

In a sense, the clamping device F for the head acts as an electrode through which current is passed. Contact is made at a given time and sufficient amperage and voltage may be applied to instantly and completely paralyze the bird. Paralysis is evidenced by sudden contraction of all muscles and this is due to the fact that the sensory and motor nerves are rendered inactive, the contraction being the normal result of the current stimulus.

In operation it is noted that the heart continues to beat in some instances even after the electrical shock is administered and after the throat is cut.

Next the bird is brought to the rotating knife 51 and the throat is cut for severing the jugular vein. Just before the clamp F comes into alignment with the circular knife 51, the roller 44 engages the cam 45 (Figure 6) and the clamping end of the arm 41 is slightly raised so that if that particular head clamp is empty, there is no danger of the yoke-like member 41b being engaged by the knife.

A trough 91 (Figure 6) is provided to receive the blood. The bird travels a substantial distance so that it may bleed properly before the head is released. The blood, under the operation of the heart, continues to be discharged and the blood is pumped out before the heart muscles cease their beating. Of course, when the vagus nerve is cut, there is a momentary reflex noted which causes some spasmodic fluttering of the fowl's eyelids and this stimulates an after surge, which assists in further blood drainage.

When the bird reaches the end of the conveyor G, the roller 44 will engage the cam track 45a (Figures 1 and 6) whereby the clamping arm 41 is operated to free the head, thus releasing the head and permitting the bird to be entirely suspended from the carrier D and to be conveyed to the steaming chamber which is the subject of our application, Serial No. 38,918. Table 94 is merely a work-table on which the birds may be placed if desired.

Apparatus II

In Figures 8 to 15, we have shown a somewhat different form of apparatus embodying our invention. This structure is shown in our co-pending application, Serial No. 746,680, of which the present application is a continuation in part.

Figure 8:
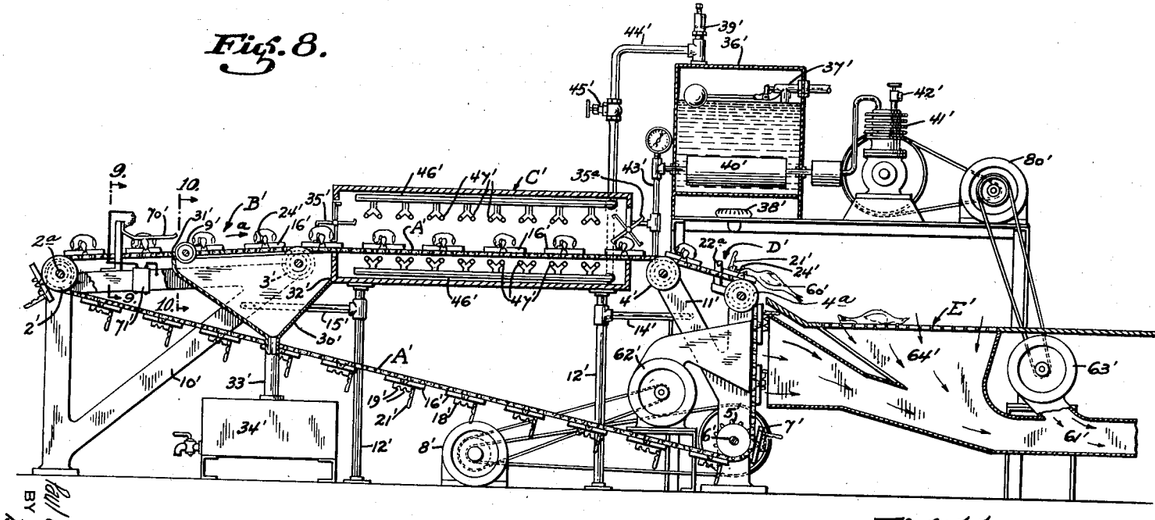
Figure 8 is a side elevation partly in section of another form of our machine.
Figure 9:
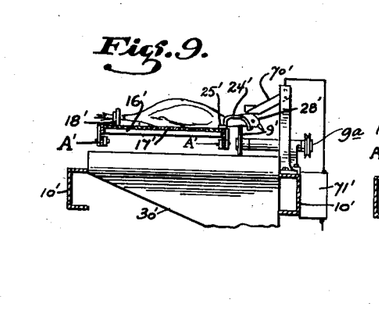
Figure 9 is a cross section of the machine taken on the line 9—9 of Figure 8.

In Figure 8, is shown a frame 10' and a somewhat similar frame 11'. A pair of laterally spaced sprocket chains A' travels over sprockets 2' and 3' on the frame 10' and the sprockets 4', 4a and 5'. These are idler sprockets except the sprockets 5', which are fixed to the transverse shaft 6' on which is a pulley 7' belt-driven from a motor 8'.

The conveyor during its travel passes over a table B' at the forward end of which the birds are applied and secured to the conveyor, after which they are electrically stunned. Their throats are cut by a revolving knife 9' and they are bled.

Thereafter the conveyor enters a steaming box indicated generally at C', where the feathers are loosened by jets of steam.

Finally the conveyor passes out of the box C' and over a table D', where the birds are automatically released from the conveyor and delivered by gravity to a table E', where the feathers are removed by hand picking or otherwise.

This steam box is disclosed in our Patent No. 2,152,082 issued March 28, 1939.

The sprocket wheels 2' are journaled on a transverse shaft 2a and the sprockets 3', 4' and 4a are journaled on suitably mounted transverse shafts. The box C' is supported by posts 12' connected with the frames 10' and 11' through brace arms 15' and 14'.

Suitably secured between the chains A' of the endless conveyor are frames 16' arranged in spaced pairs and connected by foraminous sheets, for instance, of wire mesh 17' upon which the birds to be handled are placed.

Figure 11:
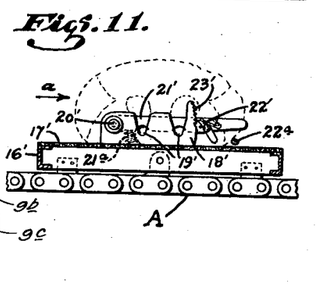
Figure 11 is a side elevation of the means by which the legs are secured to the conveyor, viewed from the opposite side of the machine to that shown in Figure 8, parts of the machine being shown in section.
Figure 12:
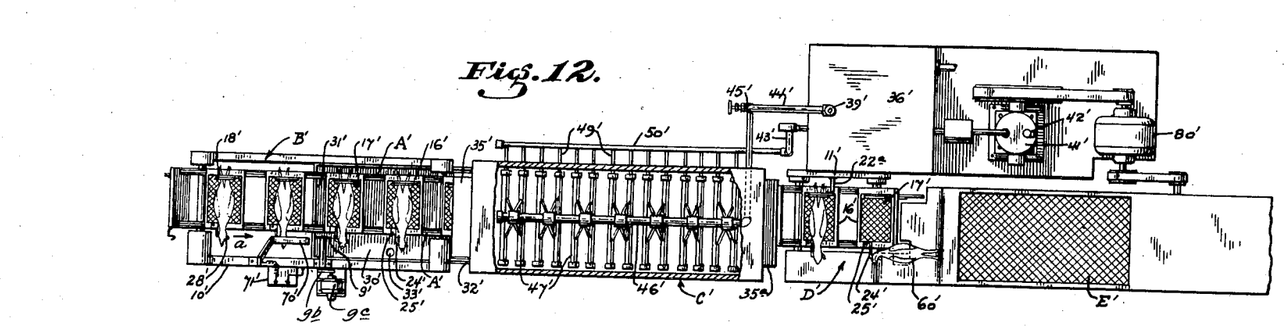
Figure 12 is a plan view of the machine of Figure 8, parts being broken away.

As shown for instance in Figure 11, there is secured at one end of each frame 16' and foraminous sheet 17' a bar 18' having in its upper edge a pair of spaced recesses or notches 19' to receive the legs of a bird.

Pivotally attached to the bar 18' at 20' is a clamping lever 21'. This lever may be raised to permit the legs of the bird to be placed in the notches 19', whereupon the lever is lowered and functions to hold the legs of the bird in those notches.

On one end of the bar 18' are provided ratchet teeth 23', and on the clamping lever 21' is a pivoted pawl 22' arranged to coact with these ratchet teeth.

*Head clamp of Apparatus II*

Figures 13, 14, 15:
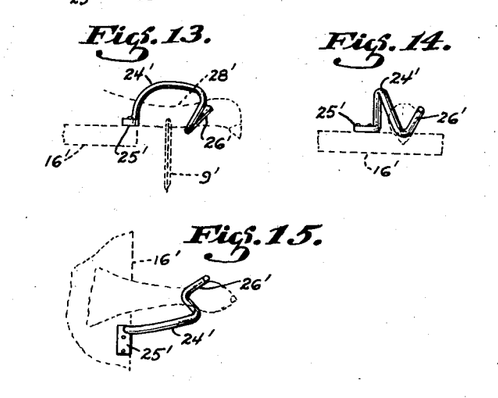
Figure 13 is an elevation of a hook whereby the head of the bird is secured to the conveyor viewed from the front of the machine.
Figure 14 is an elevation of the hook viewed from the side of the machine.
Figure 15 is a top or plan view of the hook shown in Figure 14.

For securing the head of the bird when it is placed on one of the frames, there may be employed a peculiarly shaped holder, mounted on the frame and projecting laterally therefrom, as illustrated in Figures 13, 14 and 15. This holder consists of a wire arm or the like 24' generally of U-shape and having one end secured to the frame as at 25'. At the other end, the wire arm 24' has a reversibly opened V-shaped hook 26'.

Also, as shown in Figure 13, the apex of the V is tipped downwardly and toward the opposite side of the conveyor, so that when the neck of the bird is placed in the V and the bird is pulled toward the other side of the conveyor and the legs are then clamped in place, the neck will be pulled down into the V and the head will be pulled against the V and the bird will be firmly clamped in place.

The clamping arm 24' and its V-shaped hook 26' held the head in a position projected beyond the side of the conveyor where the throat is exposed as the conveyor travels in the direction of the arrow a (Figure 8).

*Knife of Apparatus II*

Figure 10:
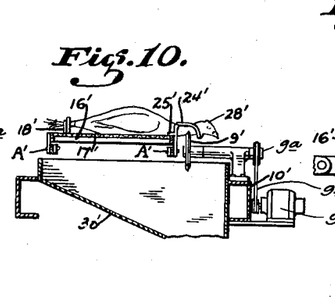
Figure 10 is a cross section of the machine taken on the line 10—10 of Figure 8.

The knife 9' (Figures 8 and 9) is mounted on a shaft 9a, which is operated by a belt and pulley structure 9b from a motor 9c (Figure 10). A trough 30' extends from 31' to 32' to receive the blood and is arranged to discharge through a pipe 33' into a tank 34'.

*Steam box Apparatus II*

The steam box is the subject of our earlier application Serial No. 746,680 and is described here only to briefly show its relation to the other parts.

It has a revolving entrance shutter 35' and a similar revolving exit shutter 35a. Steam is supplied from a boiler 36' having the float actuated inlet valve 37' whereby a predetermined water level is maintained.

The boiler is heated by a burner 38' and is provided with a safety valve 39'. In the lower part of the boiler is an air heating tank 40' connected with an air compressor 41' having an intake control 42'. The heated air is discharged from the air tank 40' to the nozzles in the steam box.

Steam passes through a pipe 44' in which is the regulating valve 45' to the manifold 46' in the steam box. The manifold is provided with nozzles 47'. From the steam box the birds pass to the table D'. A rod 22a disposed at one side of the conveyor will here engage the pawl 22' and release it. A spring 21a (Figure 11) positioned adjacent the pivotal point of the lever 21' will swing the lever about its pivot and the legs of the bird will thus be released.

The table D' is disposed on a considerable incline and the birds will swing around by gravity as indicated at 60' in Figure 8 and in so swinging will be released from the V portion 26' or they may be lifted clear and deposited on the table E'. The table is foraminous and suction on the underside is provided by jets of air issuing from blowers at 62' and 63' discharging into the hopper 64' and the conduit 61' for carrying the feathers away and maintaining the suction action mentioned.

*Electrical Apparatus II*

Before the birds are carried to the knife 9', they are electrically shocked and preferably stunned. Suitably mounted on the frame of the machine is a transformer 71' supplied with current from any suitable source. The circuit is grounded on the frame as shown in Figure 8 and is arranged to include a contact arm 70' supported on but insulated from the frame. The arm 70' is so located that it will engage the combs or top portions of the heads of the birds as they are moved along by the conveyor. The circuit is completed through the frame of the machine to the legs, bodies or necks of the birds. The current may flow through the neck to the portion 24' and through the body to the part 17 and through the body and legs to the foot clamps in an amount inversely proportional to the resistance of the paths.

*Operation*

In operation, each bird is clamped in place in the manner hereinbefore described and travels along with the conveyor and is electrically stunned, has its throat cut by the knife 9' and is bled. The effect is similar to that already explained in connection with the first form of the apparatus.

We claim:

1. In a machine of the character described a conveyor, means for securing the head and feet of a bird to the conveyor, a knife in the path of travel of the conveyor to cut the throat of the bird and permit bleeding thereof, and means for automatically releasing the feet of the bird from the conveyor, said releasing of the feet causing the bird to fall by gravity and to be automatically released from the head securing means.

2. In a machine of the character described a conveyor comprising a pair of spaced endless sprocket chains, a plurality of screen covered frames secured to the chains and disposed crosswise thereof, a clamp at one end of each frame to secure the legs of a bird, means at the opposite end of each frame for receiving and securing the head of each bird, means for imparting movement to the conveyor, means in the path of the conveyor for cutting the throats of the birds to bleed them, means for receiving and retaining the blood, and means for automatically releasing the clamps to permit removal of the birds from the conveyor.

3. In a machine of the character described a conveyor comprising a pair of spaced endless sprocket chains, a plurality of screen covered frames secured to the chains and disposed crosswise thereof, a clamp at one end of each frame to secure the legs of a bird, means at the opposite end of each frame for receiving and securing the head of each bird, means for imparting movement to the conveyor, means in the path of the conveyor for electrically stunning the birds, means in the path of travel of the conveyor for cutting the throats of the birds to bleed them, means for receiving and retaining the blood, and means for automatically releasing the clamps to permit removal of the birds.

4. The process of slaughtering which consists in first securing and holding the carcass at a plurality of points thereof in a position such that when the throat is cut, blood will fall under the influence of gravity along a path out of contact with the carcass, then applying to the carcass so held an electric current of such intensity and character that it is sufficient to stun but insufficient to stop heart action, thereafter cutting the throat to permit bleeding under the influence of heart action and after bleeding is complete, releasing the fowl.

5. The process of slaughtering which consists in first securing and holding the carcass at a plurality of points thereon in a position such that when the throat is cut, blood will fall under the influence of gravity along a path out of contact with the carcass, then conveying the carcass forwardly without change in relative position except for the forward movement through a treatment zone wherein first there is applied to the carcass an electric current of such intensity and character that it is sufficient to stun but insufficient to stop heart action, then further conveying the carcass without change in relative position other than the conveying along a treatment zone and cutting the throat to permit bleeding under the influence of the heart action and then further conveying the carcass away from the bleeding portion of the zone and after bleeding is complete, releasing the carcass.

6. The process of slaughtering which consists in first gripping a portion of the carcass and feeding it forwardly along a treatment zone, then gripping another part of the carcass thereby holding it in such position that when the throat is cut, blood will fall under the influence of gravity along a path out of contact with the carcass, then while still so holding it, applying to the carcass an electric current of such intensity and character that it is sufficient to stun but insufficient to stop heart action, then while still holding it, cutting the throat of the carcass to permit bleeding, and then after bleeding is complete, releasing the hold which was second applied and then releasing the first hold.

7. The process of slaughtering which consists in first gripping a portion of the carcass and feeding it forwardly along a treatment zone, then gripping another part of the carcass thereby holding it in such position that when the throat is cut, blood will fall under the influence of gravity along a path out of contact with the carcass, then while still so holding it applying to the carcass an electric current of such intensity and character that it is sufficient to stun but insufficient to stop heart action, then while still holding it, cutting the throat of the carcass to permit bleeding, and then after bleeding is complete, releasing the hold which was second applied and then releasing the first hold, the various steps above referred to, taking place successively as the carcass is moved continuously forward through the treatment zone.

8. A slaughtering apparatus comprising means for holding the carcass in such position that when the throat is cut, blood will fall by gravity from the cut along a path out of contact with the carcass, automatic means for applying an electric current to the carcass of such intensity and character that it is sufficient to stun but insufficient to stop heart action, automatic means for then cutting the throat of the carcass and for holding it in position until bleeding has been completed and for then releasing it.

9. A slaughtering apparatus comprising means for first gripping the carcass at one place, then gripping it at another spaced place whereby it is held in such position that when the throat is cut the blood will flow by gravity from the cut along a path out of contact with the carcass, means for while still holding the carcass in such position moving it forwardly through a treatment zone, automatic means therein for first applying electric current to the carcass of such intensity and character that it is sufficient to stun but insufficient to stop heart action, automatic means for then cutting the throat to permit bleeding, and means for releasing the second mentioned carcass holding means and then releasing the first carcass holding means.

10. A slaughtering apparatus comprising a conveyor, means for attaching the carcass to such conveyor and for holding it in such position thereon that when the throat is cut, the blood will flow by gravity along a path out of contact with the carcass, means adjacent the path of the conveyor including an electric terminal adapted to engage the carcass as it is moved forwardly by the conveyor, the electric current being of such character and intensity as to stun but not to stop heart action, means further along the path of the conveyor for automatically cutting the throat, means associated therewith for catching the blood, and means for thereafter releasing the carcass and discharging it from the conveyor.

11. A slaughtering apparatus comprising a conveyor, means for attaching the carcass to such conveyor and for holding it in such position thereon that when the throat is cut, the blood will flow by gravity along a path out of contact with the carcass, means adjacent the path of the conveyor including an electric terminal adapted to engage the carcass as it is moved forwardly by the conveyor, the electric current being of such character and intensity as to stun but not to stop heart action, means further along the path of the conveyor for automatically cutting the throat, means associated therewith for catching the blood, and means for thereafter releasing the carcass and discharging it from the conveyor, the carcass holding means being adapted to hold the carcass at two spaced points whereby it is held in such position at all times that accurate engagement of the carcass with the electric contact and the throat cutting means is insured and that the carcass is protected from contact with the flowing blood.

12. In apparatus for stunning or killing poultry by electricity, a support, means thereon for holding the bird in desired position, and an electric circuit having one pole adapted to be attached to a desired part of the bird and a second pole adapted to contact the head of the bird to complete the circuit through the body of the bird.

13. In a machine of the character described a main and a secondary conveyor, means for driving the conveyors in unison, means for securing the legs of a bird to the main conveyor, means on the second conveyor for receiving and securing the head of the bird, and means cooperating with the second conveyor for electrically stunning the bird.

14. In a machine of the character described a main and a secondary conveyor, means for driving the conveyors in unison, means for securing the legs of a bird to the main conveyor, means for securing the head of the bird to the secondary conveyor, means in the path of travel of the secondary conveyor for electrically stunning the bird, and means for cutting the throat of the bird after the electrical stunning operation.

15. In a machine of the character described a main and a secondary conveyor, means for driving the conveyors in unison, means for securing the legs of a bird to the main conveyor, means for securing the head of the bird to the secondary conveyor, means in the path of travel of the secondary conveyor for electrically stunning the bird, and a revolving knife in the path of travel of the last-named conveyor for cutting the throat of the bird.

16. In a machine of the character described a main and a secondary conveyor, means for driving the conveyors in unison, means for securing the legs of a bird to the main conveyor, means for securing the head of the bird to the secondary conveyor, means in the path of travel of the secondary conveyor for electrically stunning the bird, a revolving knife in the path of travel of the last-named conveyor for cutting the throat of the bird, an elongated trough disposed below the conveyor into which the blood drains, and means for automatically releasing the head of the bird after it has been bled to permit the bird to hang in a suspended condition from the main conveyor.

17. In a machine of the character described a main and a secondary conveyor, means for driving the conveyors in unison, means for securing the legs of a bird to the main conveyor, a manually opened clamping member on the secondary conveyor for receiving and securing the head of the bird, and means for establishing an electric circuit through said clamping member to electrically stun the bird.

18. In a machine of the character described a main and a secondary conveyor, means for driving the conveyors in unison, means for securing the legs of a bird to the main conveyor, a manually opened clamping member on the secondary conveyor for receiving and securing the head of the bird, means for establishing an electric circuit through said clamping member to electrically stun the bird, and other means for automatically opening said clamping member to release the head of the bird to permit the bird to hang in a suspended condition from the main conveyor.

19. In a machine of the character described a main and a secondary conveyor, means for driving the conveyors in unison, means for securing the legs of a bird to the main conveyor, a manually closable clamping member on the secondary conveyor for receiving and securing the head of the bird, means for establishing an electric circuit through said clamping member to electrically stun the bird, a knife in the path of travel of the secondary conveyor for cutting the throat of the bird, and means for opening the clamping member to release the head of the bird.

20. In an apparatus for use in stunning or killing poultry by electricity, a support, resilient means on said support to hold the head of a bird, means to hold a foot of said bird, and an electric circuit, said circuit including the means to hold the foot of said bird and a contact adapted to be held against the head of said bird.

21. In an apparatus of the kind described, conveyor means, means for securing a bird to the conveyor means for holding the bird in such position that when the throat of the bird is cut, blood will fall by gravity along a path out of contact with the bird, means for cutting the throat of the bird while it is so held and means near said throat cutting means for subjecting the bird to electric shock while the bird is so held.

22. In an apparatus of the kind described, conveyor means, means for securing a bird to the conveyor, means for cutting the throat of the bird while it is so held and while it is being advanced by the conveyor and means near said throat cutting means for subjecting the bird to electric shock while the bird is so held and while it is being advanced by the conveyor, whereby the throat is cut and the shock is administered so that the bird will be subject to the influence of the shock while bleeding.

PAUL ONORATO.
EMILE WEINAUG.